Oct. 20, 1942.   C. C. GOETZ   2,299,227
COMBINATION LANDING GEAR AND AIRCRAFT GUN RECOIL MECHANISM
Filed July 22, 1941   4 Sheets-Sheet 1
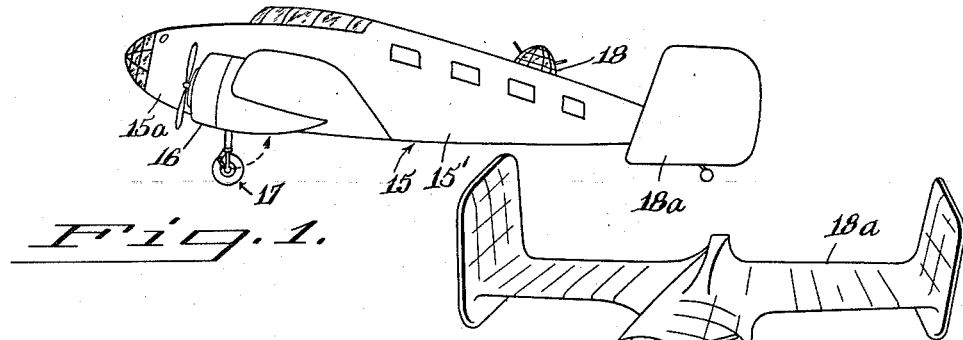
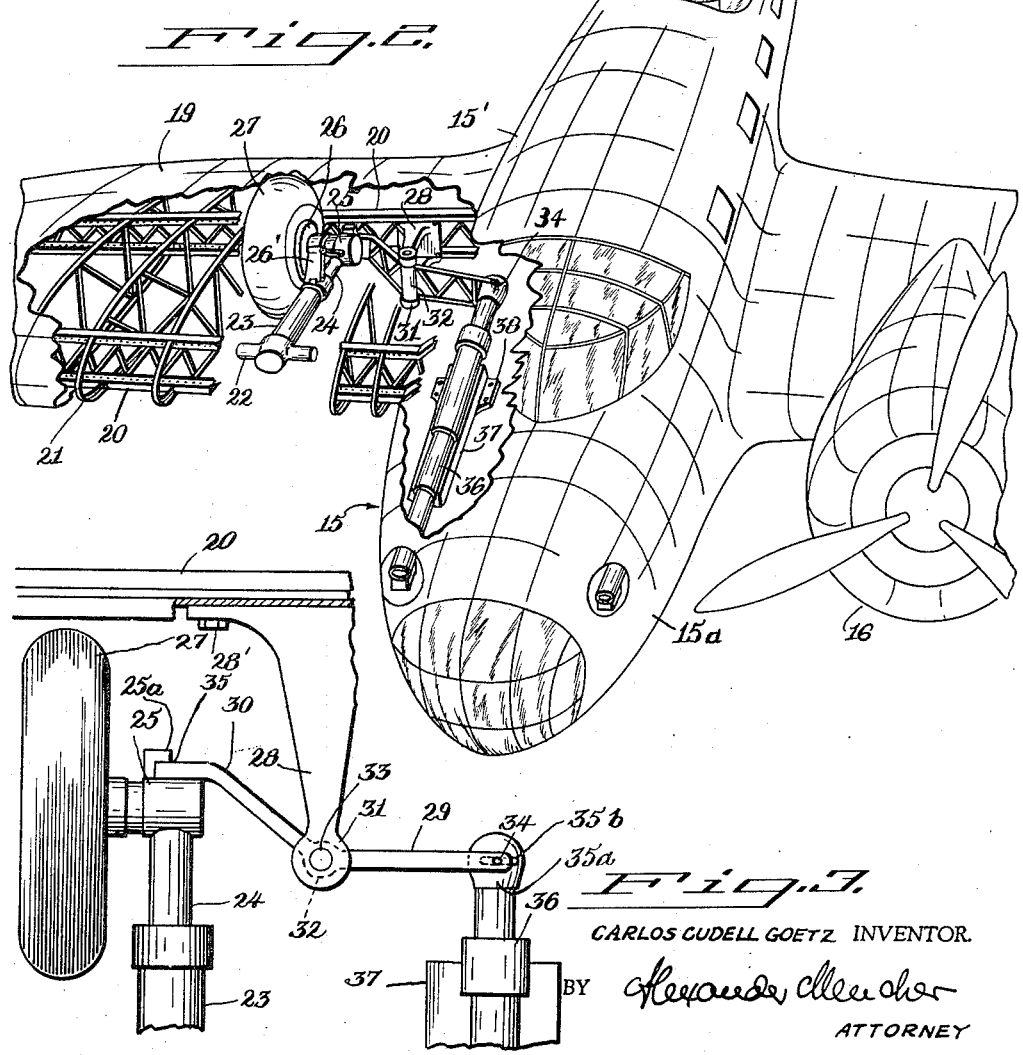
CARLOS CUDELL GOETZ INVENTOR.
BY
ATTORNEY Oct. 20, 1942.　　　　C. C. GOETZ　　　　2,299,227
COMBINATION LANDING GEAR AND AIRCRAFT GUN RECOIL MECHANISM
Filed July 22, 1941　　　　4 Sheets-Sheet 2
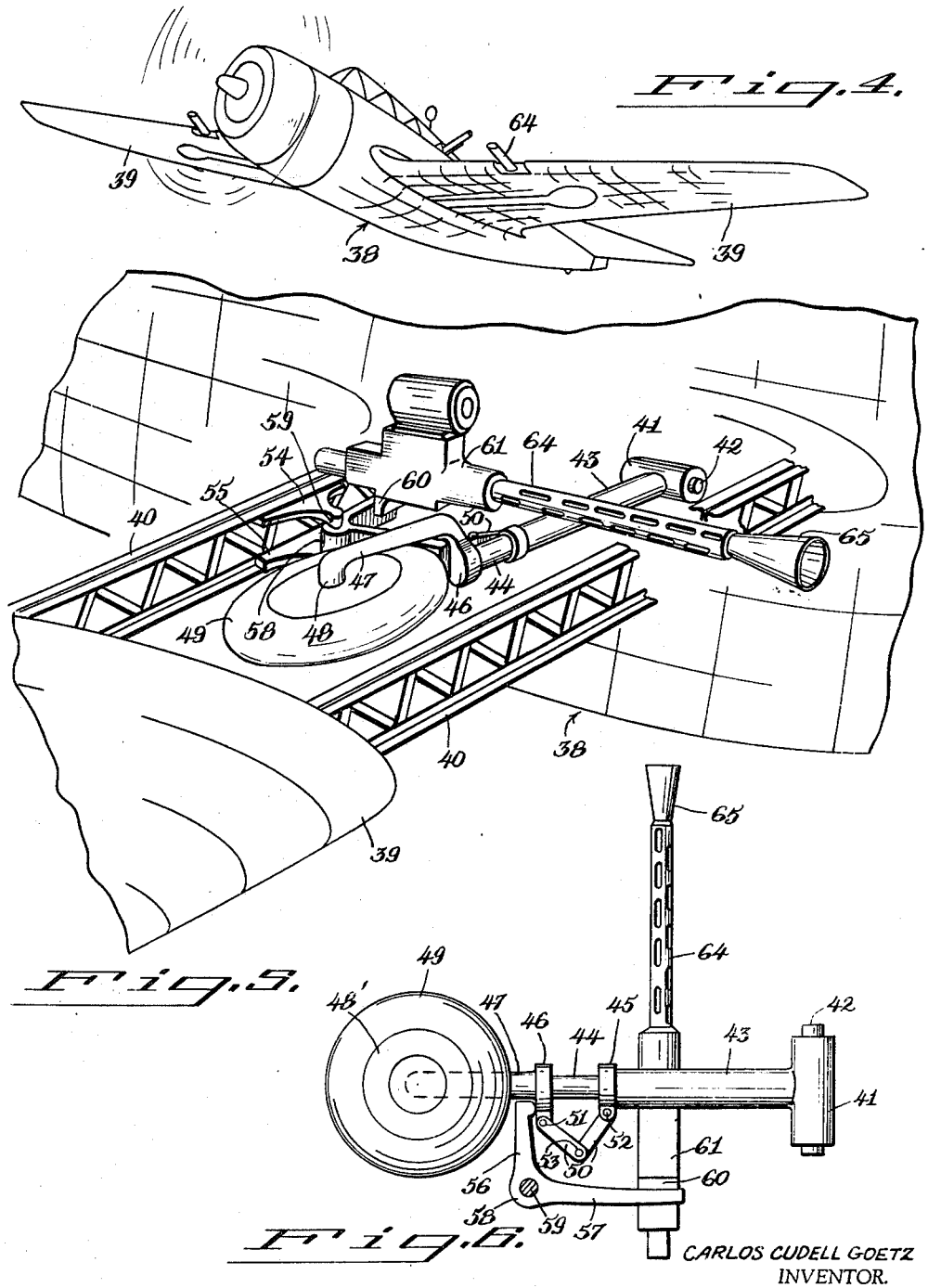
CARLOS CUDELL GOETZ
INVENTOR.
BY
ATTORNEY Oct. 20, 1942.  C. C. GOETZ  2,299,227
COMBINATION LANDING GEAR AND AIRCRAFT GUN RECOIL MECHANISM
Filed July 22, 1941  4 Sheets-Sheet 3
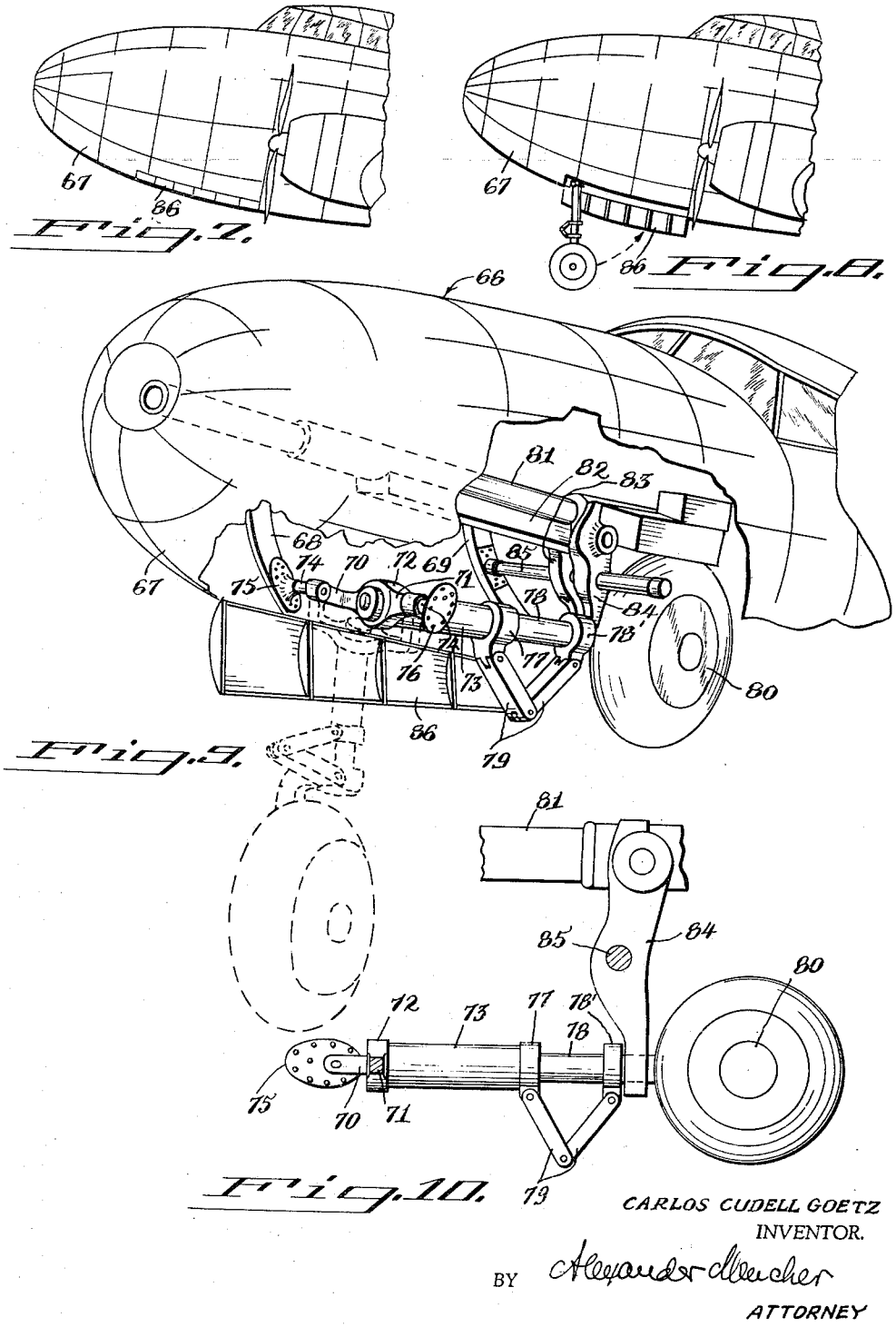
CARLOS CUDELL GOETZ
INVENTOR.
BY Alexander Bleucher
ATTORNEY Oct. 20, 1942.　　　C. C. GOETZ　　　2,299,227
COMBINATION LANDING GEAR AND AIRCRAFT GUN RECOIL MECHANISM
Filed July 22, 1941　　　4 Sheets-Sheet 4
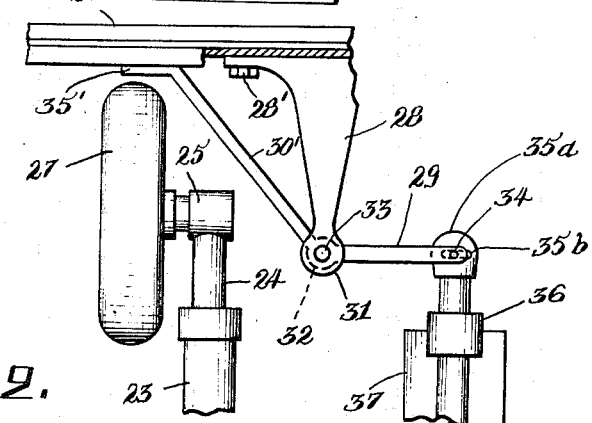
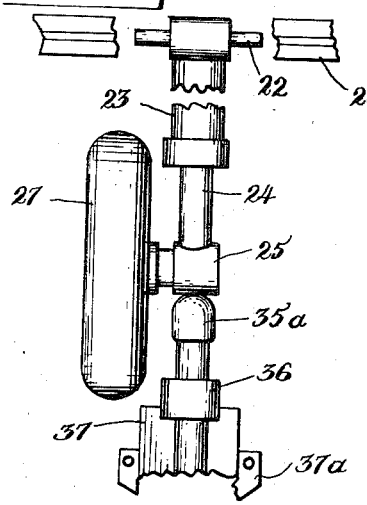
CARLOS CUDELL GOETZ
INVENTOR.
BY *Alexander Meercher*
ATTORNEY.

Patented Oct. 20, 1942

2,299,227

UNITED STATES PATENT OFFICE 2,299,227

COMBINATION LANDING GEAR AND AIRCRAFT GUN RECOIL MECHANISM

Carlos Cudell Goetz, New York, N. Y.

Application July 22, 1941, Serial No. 403,520

8 Claims. (Cl. 89—37.5)

This invention relates generally to military aircraft, but more specifically to the mounting of weapons in cooperation with the landing gear.

The main object of the invention is to provide a system and means for reducing the basic load of military aircraft by eliminating recoil equipment accompanying pieces of ordnance such as guns inclusive of cannon, and utilizing the landing gear mechanism for energy dissipation and shock absorption.

Oleo and oleo-pneumatic landing gears dissipate the energy of landing, absorb shock and return the legs thereof to normal position after landing in the same manner as the devices of a recoil system for weapons dissipate the energy of recoil, absorb shock and return the weapon to firing position. In landing gears, the energy dissipating and shock absorption elements generally comprise an oil-filled cylinder in which a piston of a dimensioned orifice and secured to the landing gear axle is adapted to move. Rubber disks or helical springs installed above the piston return the latter to position after the shock of landing has been absorbed in the non-pneumatic type while in the pneumatic type, compressed air is utilized to perform the function of the spring or rubber disks. To prevent violence in the return of the piston, a damping valve is usually provided.

In recoil systems for ordnance pieces or weapons equipped with carriages and slidable thereon or movable thereabout on recoil, a recoil brake, a spring or counter-recoil mechanism and a counter-recoil buffer, or variations and combinations thereof are used to dissipate the energy of recoil, absorb the shock thereof and to gently return the weapons to firing position without disturbing the original setting thereof. Such recoil devices are usually arranged in a concentric grouping in the cradle which supports the weapon and are a determining factor in measuring the capacity of aircraft for the carrying of weapons of particular number and calibre.

It is therefore a further object of the invention to increase the capacity of military aircraft for guns subject to sliding along or movement about carriages on recoil in both number and calibre by engaging such weapons with the landing gear as a recoil mechanism thereby eliminating the full weight of standard recoil devices associated with gun carriages. Moreover, the landing gear may be adjusted for variations in the energy of recoil due to changes in the size and number of weapons carried, and for differences between landing impact and energy of recoil of the weapons by the switching of differently dimensioned orifices in the piston.

Another object of the invention is to improve the all-around performances of aircraft and reduce the cost of manufacture by eliminating the load of the recoil mechanisms associated with the weapons and by reducing the weight of the structural parts of the craft owing to the absence of stresses and strains induced by the recoil mechanism load.

Other objects and ends of the invention will hereinafter appear in the progress of the disclosure and as pointed out in the appended claims.

Accompanying this specification are drawings showing preferred embodiments of the invention and wherein corresponding characters designate corresponding parts throughout the several views and wherein:

Figure 1 is a side view in perspective showing a military plane with landing gear in extended position.

Figure 2 is an enlarged front view in perspective of the plane shown in Figure 1 with the landing gear retracted rearwardly into the wing and with parts broken away to illustrate details of construction.

Figure 3 is a fragmentary and enlarged plan view showing details of construction of a form of invention shown in Fig. 2.

Figure 4 is a perspective view of an interceptor plane in flight with the landing gear in laterally retracted position in the wing.

Figure 5 is fragmentary and perspective view partly broken away and on an enlarged scale showing the spacial relationship between a machine gun in the wing of a plane and the retracted landing gear.

Figure 6 is a bottom plan view showing the relationship of the machine gun and the landing gear of Figure 5.

Figure 7 is a partial side view in elevation of a bomber provided with a nose wheel in retracted position.

Figure 8 is a view similar to Figure 7 showing the nose wheel in extended position.

Figure 9 is a perspective view of the nose of the bomber showing the spacial relationship between a cannon and the retracted nose wheel with parts broken away, the landing gear being shown in dotted lines in its extended position.

Figure 10 is a side view in elevation of the landing gear in connected relationship with a portion of the gun shown in Figure 9.

Figure 11 is a fragmentary and enlarged plan view showing details of construction of another form of the invention distinguished from Figure 3 in showing the relationship between a gun and the tire of the landing gear.

Figure 12 is a fragmentary and enlarged plan view showing details of construction of a further form of the invention showing a weapon in direct engagement with the landing gear.

In accordance with the invention, Figures 1, 2, 3 and 12 illustrate how the energy of recoil of a gun mounted on each side of the nose of a military plane is transmittable to a yieldable member having a return force on compression such as the oleo strut of landing gear when the latter is retracted into the wings longitudinally and rearwardly and forwardly of the plane. The oleo strut, as in a weapon recoil device, returns the gun to firing position without shock. Figures 4–6 illustrate how the energy of recoil of a machine gun mounted on each wing of an interceptor plane is transmittable to the oleo strut when retracted into the wings laterally and outwardly of the plane while Figures 7–10 show a gun, adapted to shoot from another portion of the plane such as through the nose of the fuselage, mounted in the nose portion of a bomber and is connected to landing gear such as the oleo strut of a nose wheel rearwardly retractable into the fuselage. Figure 11 shows the transmission of the energy of recoil of a gun to the tire of the landing gear.

It is to be noted that the landing gear is free to act as a recoil mechanism only during full retraction and safety devices may be used to prevent firing of the weapons when retraction is not complete.

The system and means of engaging the gun recoil lugs with the oleo-struts as a recoil mechanism is not limited as shown to connection between a single weapon and a single oleo strut.

In the military plane shown in Figures 1 and 2 with details shown in Figures 3 and 11, guns mounted on each side of the nose are adapted to transmit the energy and shock of recoil to the oleo struts of the landing gear. Thus, the plane generally designated by numeral 15 has a fuselage 15', a nose portion 15a, nacelles 16 secured to wings 19, oleo or oleo-pneumatic landing gear generally designated by numeral 17 and being rearwardly retractable into wings 19 to be nested within nacelles 16, a weapon carrying blister 18 and a tail unit 18a. The landing gear 17 is mounted in the conventional manner within the nacelle 16 built around the framework of each wing between truss spars 20, 20 and rib members 21, the latter being secured to the spars. An end member having trunnions 22 is secured to the outer cylinder 23 of the oleo-strut, the said trunnions being rotatably mounted in sockets secured to the front spar 20, the sockets not being shown in the drawings. Inner cylinder 24 of the oleo strut is secured to axle 25 of wheel 26 provided with a pneumatic tire 27, the said cylinder being connected to outer cylinder 23 by means of a pair of torsion arms 26'. It is to be observed that torsion arms 26' are not shown on Figure 3 for purposes of clarity.

The device used for transmitting the energy and shock of recoil from the weapon to the oleo strut and for transmitting the return force from the strut to the weapon for bringing the latter back to firing position is a member hinged about bracket arms 28 secured against rear spar 20. The said member is provided with opposite and offset arms 29 and 30 proceeding from a central sleeve 32, the latter engaging a pin 33 mounted between end lugs 31 on bracket arms 28.

One end of arm 30 is offset as at 35 to be engaged between the rear of axle 25 of the landing gear, and a bracket 25a secured thereto. Arm 29 at the outer end is provided with a pin 34 to pivotally engage a recoil lug 35a of a cannon 36 supported on cradle 37, the cradle being secured to the framework of the fuselage in any conventional manner at bracket 38. Pin 34 engages recoil lug 35a in a transverse slot 35b to permit axial movement of cannon 36. The latter is adapted to fire through the nose of the plane, and with each discharge, the energy and shock of recoil is conducted from lug 35a to the oleo strut by means of the arms 29 and 30 of the hinged member. At the end of the recoil, the oleo strut is forced without shock to normal retracted position either by springs or compressed air within the cylinders and by a damping mechanism thereby returning cannon 36 to firing position. As shown in Figure 11, an arm 30' at an offset portion 35' may be used to engage tire 27 of the landing gear directly instead of the use of arms 30 engaging axle 25. In this manner, energy dissipating, shock absorbing and vibration dampening characteristics of the tire are utilized in addition to the energy dissipating and shock absorbing qualities of the oleo strut. It is to be observed that the weapon described is without standard recoil mechanism and that the conventional details of construction of the landing gear and the controls for retraction and extension of the gear are also omitted from this description.

In Figures 4, 5 and 6 are shown landing gear laterally retractable into the wings of an interceptor plane illustration the mounting of an automatic or machine gun in conjunction with the landing gear as a recoil mechanism. Thus numeral 38 indicates generally the interceptor plane while 39 represents the wings and 40, 40 the spars.

The landing gear or oleo strut may be mounted to the fuselage by means of an end member 41 having trunnions 42 rotatable mounted in sockets on the fuselage, said sockets not being shown in the figures. Numerals 43 and 44 indicate the inner and outer cylinders of the oleo strut while 45 is a collar secured to cylinder 43 and 46 is a lug secured to the end of the inner cylinder 44 forming the termination of an arm 47 secured to axle 48 of wheel 48', the latter having a pneumatic tire 49. Between collar 45 and lug 46 is a pair of torsion arms 50 linked together at the inner terminals by means of a pivot 53 and linked at the end of the arms to lug 46 and collar 45 by means of pivots 51 and 52 respectively. On the rear spar 40 are a pair of spaced brackets 54 and 55 engaging a sleeve 58 by means of a pin 59 whereby angularly disposed arms 56 and 57 extending from sleeve 58 are made swivellable about pin 59. Arms 56 and 57 are adapted to transmit forces from machine gun 61 to the cylinder 44 of the oleo strut in the same manner as the arms 29 and 39 of the construction shown in Figures 1–3.

In Figures 4, 5 and 6 a machine gun 61 is shown with the conventional cradle or carriage omitted for the sake of clarity, the said gun having a recoil lug 60 and being mounted on the wings of plane 38, the gun shown having an air cooling tube 64 and a funnel 65. Lug 60 engages arm 57 while arm 56 engages lug 46 of inner cylinder 44. During the rapid firing of the machine gun, the energy and shock of recoil is transmitted to the oleo strut while the return motion of the strut is transmitted to the gun.

Figures 7–10 illustrate a bomber showing a gun firing through the center of the fuselage and utilizing landing gear which is rearwardly retractable into the nose portion along the axis of the fuselage. The bomber is generally indicated by numeral 66, while 67 indicates the nose portion of the fuselage and 68 and 69 indicate adjacent belt frames thereof. The landing gear is pivotally secured to the fuselage by means of opposite arms 70 and 71 secured to an end collar 72 of outer cylinder 73. The outer ends of arms 70 and 71 are pivotally secured to the ends of projections 74 and 74 proceeding from plates 75 and 76, the latter being secured to belt frame 68. At the upper end of outer cylinder 73 is a collar 77 while near one end of inner cylinder 78 is another collar 78', collars 77 and 78' serving to join the ends of a pair of torsion arms 79. The end of inner cylinder 78 is connected to the axle of wheel 80, the axle not being shown in the drawings. A gun 81 adapted to shoot through the nose of the bomber is provided with a cradle 82, the said gun 81 having a recoil lug in the form of depending spaced brackets 83 and 84 suitably pivoted on a shaft 85 to permit axial movement of gun 81, said shaft being secured to the belt frame 69. The lower ends of brackets 83 and 84 on each side of the inner cylinder 78 engage the collar 78' whereby upon the recoil of gun 81, the force is transmitted to the inner cylinder 78 by the swinging movement of the brackets on shaft 85. A pair of conventional swinging doors 86 are provided on the undersurface of the nose 67 which open upon the extension of the landing gear and close upon rearward retraction.

The recoil lugs of the weapons may, if desirable, directly abut a portion of the landing gear without the intervention of linkage such as pivoted arms therebetween. Thus, as shown in Figure 12, a piece of ordnance such as cannon 36 supported on cradle 37 and provided with a recoil lug 35a all as heretofore described is suitably secured to the framework of the wing of the plane at bracket 37a. The landing gear is comprised of members also heretofore described such as an end member having trunnions 22 secured to outer cylinder 23 of oleo strut 24, the latter at the outer end being secured to axle 25 of a wheel provided with a pneumatic tire 27. However, trunnions 22 are adapted to be rotatably mounted in sockets (not shown) secured to the rear spar 20 of the wing framework for forward retraction of the landing gear as distinguished from rearward retraction shown in Figures 1, 2, 3 and 11 so that recoil lug 35a of cannon 36 becomes directly engageable with the oleo-strut 24 at axle 25 when the landing gear is in retracted position.

From the foregoing description of several embodiments of the invention, it must be observed that the connection between the weapon and the landing gear does not interfere with the free retraction and extension thereof; and that the landing gear may be retractable in any direction and mounted in any location of the plane and still be capable of engagement with the weapon mounted either proximate to or remote from the landing gear.

It is understood that all minor changes and variations in details of construction, extension, location, function and integration of parts of the invention may be resorted to without departing from the spirit of the invention and the scope of the appended claims.

I claim:

1. In aircraft, a retractable landing gear, a wheel and tire carried thereby, a slidably mounted gun subject to recoil on firing, a member carried by said gun movable therewith and engageable with the tire of said landing gear only when in retracted position to dissipate the energy and absorb the shock of recoil and dampen vibration caused by firing of the gun.

2. In aircraft, a retractable landing gear including at least one yieldable member having a return force during compression on landing of the aircraft, a slidably mounted gun subject to recoil on firing, engaging means between a portion of the landing gear when in retracted position and the gun to dissipate the energy and absorb the shock of recoil after firing of the gun and to conduct the return force of the landing gear to bring the gun back to firing position.

3. In aircraft, a retractable landing gear including a yieldable strut having a return force during compression on landing of the aircraft, a wheel and tire carried by said strut, a slidably mounted gun subject to recoil on firing, a member carried by said gun movable therewith and engageable with the tire when the landing gear is in retracted position to dissipate the energy and absorb the shock of recoil and dampen vibration caused by firing of the gun and to conduct the return force of the landing gear to bring the gun back to firing position.

4. In aircraft, a retractable landing gear including a yieldable strut having a return force during compression on landing of the aircraft wheel and a pneumatic tire carried thereby, a slidably mounted gun subject to recoil on firing, pivotal engaging means between the tire of the landing gear when in retracted position and the gun to dissipate the energy and absorb the shock of recoil and dampen the vibration caused by firing of the gun and to conduct the return force of the landing gear to bring the gun back to firing position.

5. In aircraft, a landing gear retractable within a part of the plane and including energy dissipating means having a return force during compression on landing of the aircraft, a slidably mounted gun subject to recoil on firing, engaging means between the landing gear when in retracted position and the gun to dissipate the energy and absorb the shock of recoil after firing of the gun and to conduct the return force of the landing gear to bring the gun back to firing position.

6. In aircraft, in combination, a retractable energy-dissipating landing gear, a gun slidably mounted to a portion of the aircraft and being subject to recoil on firing, extension means carried by the gun, a pivotal member connecting the landing gear when in retracted position with said extension means whereby the force of recoil of the gun is transferred to the landing gear for energy dissipation.

7. In aircraft, in combination, energy dissipating landing gear, a gun slidably mounted to a portion of the aircraft and being subject to recoil on firing, a recoil lug carried by the gun, a pivotal member connecting the landing gear to said recoil lug whereby the force of recoil of the gun is transferred to the landing gear for energy dissipation.

8. In aircraft, in combination, energy dissipating landing gear, a gun slidably mounted to a portion of the aircraft and being subject to recoil on firing, a recoil lug carried by the gun and being engageable with the landing gear whereby the force of recoil of the gun is transferred to the landing gear for energy dissipation.

CARLOS CUDELL GOETZ.